United States Patent [19]

Watanabe et al.

[11] Patent Number: 5,100,581
[45] Date of Patent: Mar. 31, 1992

[54] METHOD OF PREPARING HIGH-PURITY AQUEOUS SILICA SOL

[75] Inventors: Yoshitane Watanabe, Funabashi; Hiromi Suzuki; Mikio Ando, both of Chiba, all of Japan

[73] Assignee: Nissan Chemical Industries Ltd., Tokyo, Japan

[21] Appl. No.: 496,254

[22] Filed: Mar. 20, 1990

[30] Foreign Application Priority Data

Feb. 22, 1990 [JP] Japan .................. 2-42003

[51] Int. Cl.$^5$ .................. B01J 13/00; C01B 33/14
[52] U.S. Cl. .................. 252/313.2; 51/308; 106/287.34
[58] Field of Search .................. 252/313.2; 106/287.34

[56] References Cited

U.S. PATENT DOCUMENTS

| | | | |
|---|---|---|---|
| 2,574,902 | 11/1951 | Bechtold et al. | 252/313.2 |
| 2,577,484 | 12/1951 | Rule | 252/313.2 |
| 2,750,345 | 6/1956 | Alexander | 252/313.2 |
| 3,012,973 | 12/1961 | Atkins | 252/313.2 |
| 3,440,174 | 4/1969 | Albrecht | 252/313.2 |
| 3,822,216 | 7/1974 | Schaefer | 252/313.2 |

FOREIGN PATENT DOCUMENTS 521741  2/1956  Canada .................. 252/313.2

Primary Examiner—Richard D. Lovering
Attorney, Agent, or Firm—Oliff & Berridge

[57] ABSTRACT

A high-purity stable aqueous silica sol is prepared which has an $SiO_2$ concentration of from 30 to 50% by weight and which is substantially free from any other polyvalent metal oxides than silica and in which the colloidal silica has a mean particle size falling within the range of from 10 to 30 millimicrons. The silica sol obtained by the method of the present invention has an extremely low content of oxides of polyvalent metals such as iron or aluminum and may therefore be employed for uses which require the absence of such metals in the silica sol, for example, as an abrasive for semiconductors.

11 Claims, No Drawings

METHOD OF PREPARING HIGH-PURITY AQUEOUS SILICA SOL

BACKGROUND OF THE INVENTION

1. Field of the Invention

The present invention relates to improvement of a method of preparing a high-purity stable aqueous silica sol which has an $SiO_2$ concentration of from 30 to 50% by weight and which is substantially free from any other polyvalent metal oxides than silica and in which the colloidal silica has a mean particle size of falling within the range of from 10 to 30 millimicrons.

In particular, the silica sol to be obtained by the method of the present invention has an extremely low content of oxides of polyvalent metals such as iron or aluminum and is therefore employed for the use which desires the absence of such metals in the silica sol, for example, as an abrasive for semiconductors.

2. Description of the Prior Art

A stable aqueous silica sol of industrial products which are used in various uses is prepared from water-soluble alkali metal silicates, in particular, from water glass of industrial products which are inexpensive and are easily available.

However, the stable aqueous silica sol to be prepared from water glass often has some problems because of the metal oxides which are generally in the silica sol in a slight amount, especially polyvalent metal oxides therein, in some uses, for example as an abrasive for polishing the surfaces of semiconductors, as a raw material for preparing quartz fibers or in any other uses which require a high-purity sol, since the techniques in the field have been high-leveled in these days.

A method of preparing an aqueous silica sol which is substantially free from alkali metal oxides is already known. For example, U.S. Pat. No. 4,054,536 illustrates a method of preparing an aqueous silica sol which is substantially free from alkali metal oxides, wherein an aqueous sol having pH of from 8 to 10 and $SiO_2$ content of from 5 to 55%, which is obtained by adding an aqueous silicic acid solution with a concentration of from 2 to 10% to a hot aqueous solution of an alkanolamine in a proportion of from 1 to 100 as the molar ratio of $SiO_2$ to the amine with removing water by distillation, is passed through ion-exchange resins . to thereby form an aqueous silica sol having an alkali metal content of 200 ppm or less and having pH of from 2 to 5, and thereafter ammonia is added to the resulting sol so as to make it to have pH of from 9 to 10 whereby a silica sol having an alkali metal content of 200 ppm or less is obtained.

Japanese Patent Application Laid-Open No. 61-158810 has proposed a method of obtaining a silica sol having a low content of any other polyvalent metal oxides than silica, wherein a silicic acid solution which is obtained by bringing an aqueous solution of an alkali silicate having a concentration of from 0.5 to 7% by weight into contact with a strong acid type cation-exchange resin for alkali-removal is treated with an acid at pH of 2.5 or less and at a temperature of from 0° to 98° C., then the impurities in the thus treated solution are removed by filtration through an ultrafilter, then the resulting solution is passed through a mixed bed composed of cation-exchange and anion-exchange resins and through a chelate resin layer, then ammonia or an amine is added to a part of the resulting oligo-silicic acid solution to give a heel solution having pH of from 7 to 10, and then the remaining part of the oligo-silicic acid solution is gradually and dropwise added to the heel solution at a temperature of 60° to 98° C. so as to grow the particles of the colloidal silica in the sol.

Where an aqueous silica sol is prepared by the method described in U.S. Pat. No. 4,054,536, using an aqueous solution of an active silicic acid to be obtained by passing a diluted aqueous solution of water glass of a commercial product, as a starting material, through a cation-exchange resin layer, an aqueous silica sol having an alkali metal content to silica of 200 ppm or less can be obtained. However, the aqueous silica sol to be obtained by the method is one having a content of other metals, for example, polyvalent metals such as iron or aluminum, to silica of being 300 ppm or more. The polyvalent metals which are in the aqueous silica sol in such a high content are derived from polyvalent metal oxides which are contained in the water glass of the starting material in a content of about 500 ppm or more.

In accordance with the other method as described in Japanese Patent Laid-Open Application No. 61-158810, all the alkali metals and other polyvalent metals than silicon which are in the alkali metal silicate of the starting material such as water glass are removed before preparing the silica sol. However, the removing step is not efficient as the process of industrial production of silica sol, since supplement of a separately prepared acid solution to the active silicic acid-containing aqueous solution is necessary in an amount corresponding to 20 to 10,000 times of the said aqueous solution in the step of removing the impurities from the aqueous active silicic acid solution containing the acid as previously added thereto by passing the aqueous solution through the ultrafilter. Additionally, in accordance with the method described in Japanese Patent Laid-Open Application No. 61-158810, a long period of 760 hours is necessary for the growth of the colloidal silica particles, and concentration of the resulting silica sol is effected after the completion of the growth of the particles. Therefore, such step of growing the silica particles to be followed by concentration of the resulting silica sol is not also efficient as the process of industrial production of silica sol.

Where a silica sol is employed as a binder, the sol may have a higher binding power when the particle size of the colloidal silica in the sol is smaller. On the contrary, however, the sol would be less stable when the particle size of the colloidal silica of the sol is smaller. Accordingly, in order to compensate the latter drawback, the $SiO_2$ concentration in the sol is to be lowered. In general, however, when the sol is used as a binder, it is desired to have a sufficient binding power while it has a high $SiO_2$ concentration. Regarding the particle size distribution of the colloidal silica in a sol, a broad size distribution would give a much higher binding power to the sol than those having a narrow size distribution.

Under the situation, it is one technical theme in this field to provide an improved silica sol that it may be helpful for enhancing the quality of the products to be obtained by the use of the silica sol, as inexpensive industrial products. The present invention is therefore to satisfy the theme and to overcome the problems in the above-mentioned conventional methods of producing a silica sol having a low content of other polyvalent metal oxides than silica therein. Specifically, the present invention is to provide a method of efficiently producing a stable aqueous silica sol, which has a content of other polyvalent metal oxides than silica being 300 ppm or less to silica, which has an $SiO_2$ concentration of from 30 to 50% by weight and in which the colloidal silica has a mean particle size of falling within the range of from 10 to 30 millimicrons, from an alkali metal silicate containing polyvalent metal oxides as impurities.

SUMMARY OF THE INVENTION

The method of the present invention of producing a stable aqueous silica sol which has an $SiO_2$ concentration of from 30 to 50% by weight, which is substantially free from any other polyvalent metal oxides than silica and in which the colloidal silica sol has a mean particle size of from 10 to 30 millimicrons is characterized by comprising the following steps (a), (b), (c), (d), (e), (f) and (g):

(a) a step where an aqueous solution of a water-soluble alkali metal silicate as dissolved therein in a concentration of from 2 to 6% by weight as the $SiO_2$ content to be derived from the silicate, the said silicate containing other polyvalent metal oxides than silica in a proportion to silica of from 500 to 10000 ppm, is passed through a column as filled with a hydrogen-type strong-acid cation-exchange resin in such an amount as being sufficient for ion-exchanging all the metal ions in the aqueous solution, at a temperature of from 0° to 60° C. as the liquid temperature in the inside of the column and at a space velocity of from 1 to 10 per hour, and the aqueous solution of the active silicic acid which resulted from the passing and which has an $SiO_2$ concentration of from 2 to 6% by weight and a pH value of from 2 to 4 is recovered;

(b) a step where a strong acid is added to the aqueous solution of the active silicic acid as recovered in the step (a) so that the said aqueous solution is adjusted to have a pH value of from 0 to 2.0 and then the resulting aqueous solution is kept at a temperature between 0° C. and 100° C. for a period of from 0.5 to 120 hours;

(c) a step where the aqueous solution as obtained in the step (b) is passed through a column as filled with a hydrogen-type strong-acid cation-exchange resin in such an amount as being sufficient for ion-exchanging all the metal ions in the aqueous solution, at a temperature of from 0° to 60° C. as the liquid temperature in the inside of the column and at a space velocity of from 2 to 20 per hour, the aqueous solution which resulted from the passing is then passed through a column as filled with a hydroxyl-type strong-basic anion-exchange resin in such an amount as being sufficient for ion-exchanging all the anions in the solution, at a temperature of from 0° to 60° C. as the liquid temperature in the inside of the column at a space velocity of from 1 to 10 per hour, and thereafter the aqueous solution of the active silicic acid which resulted from the passing and which is substantially free from any other soluble substances than the active silicic acid and has an $SiO_2$ concentration of from 2 to 6% by weight and a pH value of from 2 to 5 is recovered;

(d) a step where an aqueous solution of sodium or potassium hydroxide is added to the aqueous solution of the active silicic acid as recovered in the step (c), in a molar ratio of $SiO_2/M_2O$ of being from 60 to 200, $M_2O$ (where M means sodium atom or potassium atom) being one as derived from the hydroxide and $SiO_2$ being one as contained in the said aqueous solution of the active silicic acid, with keeping the liquid temperature at 0° to 60° C., thereby to form a stabilized active silicic acid-containing aqueous solution having an $SiO_2$ concentration of from 2 to 6% by weight and a pH value of from 7 to 9;

(e) a step where the stabilized active silicic acid-containing aqueous solution as obtained in the step (d) is put in a container in an amount of 1 part by weight as a heel solution whereupon the liquid temperature in the inside of the container is kept at 70° C. to 100° C., and from 5 to 20 parts by weight of the stabilized active silicic acid-containing aqueous solution as obtained in the step (d) is continuously fed into the said container as a feed solution for a period of from 50 to 200 hours while the said container is maintained to have a normal pressure or a reduced pressure and to evaporate water in liquid and the evaporated water is removed from the said container so that the content of the liquid in the inside of the container may be kept constant during the procedure, thereby to form a stable aqueous silica sol which has an $SiO_2$ concentration of from 30 to 50% by weight and in which the colloidal silica has a mean particle size of from 10 to 30 millimicrons;

(f) a step where the stable aqueous silica sol as obtained in the step (e) is passed through a column as filled with a hydrogen-type strong-acid cation-exchange resin in such an amount as being sufficient for ion-exchanging all the metal ions as contained in the sol, at a temperature of from 0° to 60° C. and at a space velocity of from 2 to 20 per hour, then the solution which resulted from the passing is passed through a column as filled with a hydroxyl-type strong-basic anion-ion-exchanging resin in such an amount as being sufficient for ion-exchanging all the anions in the solution, at a temperature of from 0° to 60° C. and at a space velocity of from 1 to 10 per hour, and then the acidic aqueous silica sol which resulted from the passing and which is substantially free from any other polyvalent metal oxides than silica is recovered; and (g) a step where ammonia is added to the acidic aqueous sol as recovered in the step (f), with keeping the temperature of the sol at 0° to 100° C. to make the pH value of the sol to be from 8 to 10.5, thereby to form a stable aqueous silica sol which has an $SiO_2$ concentration of from 30 to 50% by weight, which is substantially free from any other polyvalent metal oxides than silica and in which the colloidal silica has a mean particle size of from 10 to 30 millimicrons.

DETAILED DESCRIPTION OF THE INVENTION

The alkali metal silicate to be employed in the step (a) of the manufacture method of the present invention may be any one which is available as commercial industrial products, but a water-soluble one is preferred which has a molar ratio of silicon to alkali metals as contained therein of being approximately from 0.5 to 4.5 as $SiO_2/M_2O$ (where M means an alkali metal). In particular, for the purpose of producing the silica sol of the invention as inexpensive industrial products in a large-scaled industrial plant, sodium water glass is preferably employed which is a low-priced industrial product and which has a molar ratio of $SiO_2/Na_2O$ of being approximately from 2 to 4. However, the commercial product of water glass for industrial use generally contains some other polyvalent metal oxides than silica as impurities in an amount of approximately from 500 to 10000 ppm to the $SiO_2$ content in the water glass. Main polyvalent metals which are contained in the water glass in a relatively high content are, for example, aluminum, iron, calcium and magnesium.

In step (a) is used an aqueous solution of an alkali metal silicate, which is obtained by dissolving such an alkali metal silicate as containing the said polyvalent metal oxides than silica as impurities in water in a concentration of from 2 to 6% by weight as the $SiO_2$ content to be derived from the said silicate. As the water can be an industrial water which has been treated for removing cations therefrom.

The hydrogen-type strong-acid cation-exchange resin to be employed in the step (a) may be any one which has heretofore been utilized in this technical field for removing alkali metal ions from a water glass-containing aqueous solution, and such is easily available as a commercial product for industrial use. One example of the resin is Amberlite IR-120B (trade name).

In the step (a) of the present invention, the above-mentioned alkali metal silicate-containing aqueous solution is brought into contact with the above-mentioned hydrogen-type strong-acid cation-exchange resin. The contact is preferably conducted by passing the aqueous solution through a column filled with the ion-exchange resin at 0° to 60° C., preferably at 5° to 50° C.; and the solution as passed through the column is recovered as an active silicic acid-containing aqueous solution which has an $SiO_2$ concentration of from 2 to 6% by weight and a pH value of from 2 to 4. The amount of the hydrogen-type strong acid cation-exchange resin to be employed in the step may be such that is sufficient for exchanging all the alkali metal ions in the alkali metal silicate-containing aqueous solution by hydrogen ions. The speed of solution which is passed through the column is preferably approximately from 1 to 10 per hour as the space velocity.

As examples of the strong acid to be employed in the step (b), there are mentioned inorganic acids such as hydrochloric acid, nitric acid and sulfuric acid. Above all, nitric acid is most preferred for the purpose of elevating the percentage of elimination of the aluminum content and the iron content. The strong acid is added to the active silicic acid-containing aqueous solution as recovered in the step (b) before the solution is deteriorated after recovery and is preferably added thereto immediately after recovery thereof. The amount of the strong acid to be added is such that may make the pH value of the resulting solution to fall within the range of from 0 to 2, preferably from 0.5 to 1.8. After the addition, the solution is then maintained at a temperature between 0° C. and 100° C. for a period of from 0.5 to 120 hours, in the step (b).

The hydrogen-type strong-acid cation-exchange resin to be employed in the step (c) may be same as that employed in the previous step (a). The hydroxyl-type strong-basic anion-exchange resin to be employed in the step (c) may be any one which has heretofore been utilized for removing anions from ordinary silica sol, and such is easily available as a commercial product. One example of the anion-exchange resin is Amberlite IRA-410 (trade name).

In the step (c), the aqueous solution as obtained in the step (b) is first brought into contact with the above-mentioned hydrogen-type strong-acid cation-exchange resin. The contact is preferably effected by passing the aqueous solution through a column as filled with the above-mentioned hydrogen-type strong-acid cation-exchange resin in an amount of being sufficient for ion-exchanging all the metal ions in the solution, at 0° to 60° C., preferably at 5° to 50° C., and at a space velocity of from 2 to 20 per hour. Next, the aqueous solution as obtained by the passing is, preferably immediately after obtaining the same, then brought into contact with the above-mentioned hydroxyl-type strong-basic anion-exchange resin at a temperature of from 0° to 60° C., preferably from 5° to 50° C. The contact may also be effected preferably by passing the solution through a column as filled with the above-mentioned hydroxyl-type strong-basic anion-exchange resin at a space velocity of from 1 to 10 per hour. The aqueous solution as obtained by the passing is, more preferably immediately after obtaining the same, then desirably brought into contact with the above-mentioned hydrogen-type strong-acid cation-exchange resin at 0° to 60° C., preferably at 5° to 50° C. The contact may also be effected preferably by passing the solution through a column as filled with the above-mentioned hydrogen-type strong-acid cation exchange resin in an amount of being sufficient for ion-exchanging all the metal ions in the solution, at a space velocity of from 1 to 10 per hour. After the passing, the resulting aqueous solution is recovered, and the recovered solution is an active silicic acid-containing aqueous solution which has an $SiO_2$ concentration of from 2 to 6% by weight and a pH value of from 2 to 5. This is then applied to the next step (d).

The aqueous solution of sodium hydroxide or potassium hydroxide to be employed in the step (d) may be obtained by dissolving sodium hydroxide or potassium hydroxide of a commercial product for industrial use, which preferably has a purity of 95% or more, in a decationized industrial water, preferably in a concentration of from 2 to 20% by weight. In the step (d), the said sodium or potassium hydroxide-containing aqueous solution is added to the active silicic acid-containing aqueous solution as recovered in the step (c), preferably immediately after the recovery thereof, in a molar ratio of $SiO_2/M_2O$ of being from 60 to 200 where M has the same meaning as that mentioned above. The addition may be effected at a temperature between 0° C. and 60° C. but is preferably effected at room temperature for a possibly shorter period of time. By the addition, a stabilized active silicic acid-containing aqueous solution which has an $SiO_2$ concentration of from 2 to 6% by weight and a pH value of from 7 to 9 is obtained. Although the thus prepared solution is stable for a long period of time,. it is especially preferably applied to the next step (e) within 30 hours.

The apparatus to be employed for effecting the step (e) may be an ordinary acid-resistant, alkali-resistant and pressure-resistant container as equipped with stirrer, temperature-controlling device, liquid level sensor, pressure-reducing device, liquid-feeding device, steam-cooling device, etc. In the step (e), all or a part (1/5 to 1/20) of the stabilized active silicic acid-containing aqueous solution as obtained in the step (d) is first put in the container as a heel solution. In a large-scaled industrial production plant, it is preferred that all the aqueous solution from the step (d) is used as the heel solution, and another stabilized active silicic acid-containing aqueous solution is separately prepared in accordance with the above-mentioned continuous steps (a) to (d) and the newly prepared solution of an amount of from 5 times to 20 times of the said heel solution is used as the feed solution within 30 hours after the separate preparation of the feed solution. On the other hand, where a part, of from 1/5 to 1/20 time, of the solution as prepared in the previous step (d) is used as the heel solution in the step (e), the remaining solution is used as the feed solution.

In step (e), the liquid temperature in the inside of the container is kept at 70° to 100° C., preferably at 80° to 100° C., while the inner pressure in the container is so controlled that water may evaporate from the liquid under the controlled condition. Additionally, the feeding speed of the feed solution and the removing speed of the evaporated water are so controlled that the amount of the liquid in the inside of the container may be maintained constant and that the supplying of the feed solution may be finished within a period of from 50 to 200 hours. Supplying of the feed solution and removal of the evaporated water are always continuously or intermittently effected from the start of the step (e) to the finish thereof, but such are preferably so effected that the amount of the liquid in the inside of the container is maintained constant during the step. Additionally, it is also preferred that the feeding speed of the feed solution is constant.

The hydrogen-type strong-acid cation-exchange resin to be employed in the step (f) may be one which is same as that used in the previous steps (a) and (c). The hydroxyl-type strong basic anion-exchange resin to be used therein may also be an ordinary one which is same as that employed in the step (c). The contact of the stable aqueous sol with the ion exchange resin in the step (f) may be effected in the same manner as that in the step (c). More preferably, the solution which resulted from the contact with the anion-exchange resin is further brought into contact with the cation-exchange resin.

The ammonia to be employed in the step (g) may be a commercial product for industrial use but it is preferably a high-purity one. Desirably, it is employed in the step (g) in the form of an aqueous ammonia having an ammonia concentration of approximately from 5 to 30% by weight. In place of ammonia, quaternary ammonium hydroxides, guanidine hydroxides or water-soluble amines may also be employed. However, ammonia is generally preferred, except the case where employment of ammonia is specifically undesired.

In the step (g), the above-mentioned ammonia is added to the aqueous sol as obtained in the step (f), preferably immediately after the formation of the sol. The addition may be effected at a temperature of 0° C. to 100° C. but is preferably effected at room temperature. The amount of the ammonia to be added is preferably such that the resulting silica sol may have a pH value of from 8 to 10.5. As the case may be, an acid or ammonium salt which is free from any metal component may be added to the sol, if desired, in an amount of 1000 ppm or less.

The size of the colloidal particles in the silica sol is calculated out from the specific surface area which is measured by means of a nitrogen gas-adsorbing method of a so-called BET method, as a mean particle size of the particles by a known method. The size of the colloidal particles can be observed with an electronic microscope. The silica sol to be obtained by the step (g), which has a mean particle size of 10 millimicrons, has a particle size distribution of from the minimum particle size of approximately 4 millimicrons to the maximum particle size of approximately 20 millimicrons; and another one, which has a mean particle size of 30 millimicrons, has a particle size distribution of from the minimum particle size of approximately 10 millimicrons to the maximum particle size of approximately 60 millimicrons.

Next, the effect of the present invention will be explained in detail hereunder.

In accordance with the method of the present invention, where the alkali metal silicate-containing aqueous solution is brought into contact with the hydrogen-type strong-acid cation-exchange resin, an aqueous solution of an alkalimetal ion-free active silicic acid is formed. The active silicic acid in the aqueous solution is in the form of silicic acid or oligomers thereof, which have a particle size of 3 millimicrons or less, and the aqueous solution is so unstable that it would be gelled within about 100 hours even in the presence of polyvalent metals such as aluminum. Such instability is more noticeable when the $SiO_2$ concentration in the solution is higher or the temperature of the solution is higher. Accordingly, when a large amount of the silica sol is desired to be produced in an industrial large-scaled plant, it is recommended that the concentration of the active silicic acid in the aqueous solution to be formed in the step (a) does not exceed about 6% by weight but it is controlled to be lower than 6% by weight and that the aqueous solution having such lowered $SiO_2$ concentration is formed at room temperature. In particular, when the alkali metals or polyvalent metals as existing in the raw material are taken in the inside of the silicic acid polymer particles, such metal would hardly be removed from the particles. Therefore, the aqueous solution is desired to have a lower concentration so that polymerization of the silicic acid would hardly proceed in the solution. Additionally, for the purpose of avoiding gradual polymerization of the silicic acid which is inevitable even at room temperature, all of the aqueous solution of the active silicic acid as formed is desired to be used in the next step as early as possible after the formation thereof. If the $SiO_2$ concentration in the active silicic acid-containing aqueous solution is lower than approximately 2% by weight, such is inefficient since the amount of the water to be removed in the step of concentration of the silica sol to be formed later would be too much. In the step (a), the $SiO_2$ concentration of the alkali metal silicate-containing aqueous solution is controlled to be from 2 to 6% by weight before it is brought into contact with the cation-exchange resin, in order that the $SiO_2$ concentration of the aqueous solution of the active silicic acid to be formed in the said step (a) may be from 2 to 6% by weight and that the thus formed active silicic acid-containing aqueous solution may be directly applied to the next step (b) immediately after formation thereof.

In the step (a), the introduction of the aqueous solution into the cation-exchange resin-filled column which is preferably employed in the said step is preferably effected at a solution-passing speed of approximately from 1 to 10 per hour as the space velocity in order to remove a possibly larger amount of the metal ions from the solution. Additionally, the solution temperature is desired to be from 0° to 60° C. in order that polymerization, increase in viscosity or gellation of the active silicic acid solution would hardly occur during the passing through the columun. In the steps (a) to (c), any particular conditions are not added for stabilizing the active silicic acid-containing aqueous solution. Therefore, it is important to keep the above-mentioned $SiO_2$ concentration and the temperature in these steps.

The strong acid to be added in the step (b) has a function of converting the impurity metal components such as alkali metals or polyvalent metals which are bonded to the active silicic acid or to the inside of the polymer thereof and which are not in the form of dissociated ions into dissociated ions in the solution. Since the active silicic acid is in lower degree of polymerization, the more easily may be extracted the polyvalent metals from the active silicic acid, it is also desired that addition of the strong acid to the active silicic acid-containing aqueous solution as obtained in the step (a) is finished as early as possible.

However, if the amount of the strong acid to be added is so enlarged that the pH value of the resulting active silicic acid-containing aqueous solution becomes less than 0, removal of the anions in the next step (c) would be difficult though the effect of removing the metal components in the present step (b) would be enhanced. Additionally, when the strong acid is added in such an amount that the pH value of the resulting solution becomes more than 2, the effect of removing the metal components would be poor. Among strong acids, nitric acid has an especially high effect for removing metal components such as aluminum components or iron components. The effect of the strong acid of removing the polyvalent metal components would additionally depend upon the temperature of the solution and the treating time. For instance, when the temperature is from 0° to 40° C., the treating time is preferably from 10 to 120 hours or so, when the former is from 40° to, 60° C., the latter is preferably from 2 to 10 hours or so, and when the former is from 60° to 100° C., the latter is preferably from 0.5 to 2 hours or so. If the solution is treated with the strong acid for a longer period of time than the said ranges, the solution would often increase in viscosity or gel, as the case may be. Therefore, such is to be evaded.

In the step (c), the metal ions as dissolved out into the solution and the anions from the acid as added in the step (b) are removed by the cation-exchange resin and the anion-exchange resin. The solution resulted from the first cation-exchange resin treatment contains the anions from the acid as added in the step (b) so that the dissolved metal ions would easily remain in the solution. As the case may be, the amount of the remaining metal ions in the solution after the anion-exchange resin treatment would be such that the solution is to have a pH value of from 5 to 7. In such case, however, the solution would be gelled within about 1 hour. By the second-stage treatment with the cation-exchange resin which is effected after removal of the anions from the solution by the treatment with the anion-exchange resin, such undesired dissolved metal ions may further be removed favorably.

Since the active silicic acid-containing aqueous solution as obtained by the step (c) is so unstable that it would be gelled within 6 hours, it is applied to the next step (d) as soon as possible, preferably immediately after the formation of the solution. Where the amount of the sodium or potassium hydroxide to be added to the unstable active silicic acid-containing aqueous solution is so large that it is less than 60 as the molar ratio of $SiO_2/M_2O$, the active silicic acid would easily be polymerized and, as a result, growth of the particles in the step (e) would be insufficient or the sol formed would be unstable. On the contrary, however, where the amount is so small that the molar ratio is more than 200 particle size of the colloidal silica particles could not be enlarged even though the resulting solution is treated in the same manner as in the step (e). Although the solution as obtained in the step (d) is stable for a fairly long period of time at room temperature, polymerization of the active silicic acid therein would be accelerated at a high temperature. Therefore, it is especially preferred that the solution as obtained in the step (d) is applied to the next step (e) within 30 hours. The sodium or potassium hydroxide to be added in the step (d) gives a higher speed of growing of colloidal silica particles to the size of from 10 to 30 millimicrons in the next step (e). For instance, the speed with the sodium or potassium hydroxide is about 2 times or more than that with the same molar amount of other bases such as ammonia or amine.

Because of such high speed of growing, the feeding speed of the feed solution may be elevated in the step (e) and therefore the production speed of the silica sol as the final product of the invention is extremely elevated. Additionally, the supplying of the feed solution to be effected at such a high speed in the step (e) is also favorable for making the colloidal silica particles nonuniform in the formed silica sol and for broadening the particle size distribution of the particles therein. In the step (e), water is evaporated out from the formed sol at the same time of the supplying of the feed solution and the evaporated water is removed out from the reaction system, for the purpose of elevating the producing speed of the high concentration silica sol.

If the liquid temperature in the step (e) is lower than 70 ° C., the growth of the colloidal silica particles in the solution could not be effected sufficiently so that the resulting solution is to have colloidal silica particles having a mean particles size of less than 10 millimicrons. If the silica sol of such small silica particles is concentrated, the liquid would increase in viscosity or gel so that a stable sol having an $SiO_2$ concentration of 30% by weight or more could not be obtained. The speed of growing would be higher when the temperature of the liquid is higher than 70° C. However, if the temperature is higher than 100° C., the speed of growing would increase in so high a level as the control of the mean particle size of the particles formed would be difficult.

Where the amount of the feed solution to be supplied is less than 5 times of the amount of the heel solution, the particles could not be grown to the mean particle size of more than 10 millimicrons. In this case, therefore, it is also impossible to obtain a concentrated stable sol having a concentration of 30% by weight or more. The mean particle size of the colloidal silica particles to be formed is enlarged with increase of the amount of the feed solution to be fed. However, if the amount of the feed solution to be fed is more than 20 times of the heel solution, the mean particle size of the particles to be formed would unfavorably exceed 30 millimicrons. In such case, a sol having a high binding power could not be obtained.

Despite of the situation as above, the relation between the amount of the feed solution and the mean particle size of the colloidal particles to be formed would be further influenced by the feeding speed of the feed solution. For instance, where the feed solution in an amount of from 5 to 20 times of that of the heel solution is added to the heel solution within a period of 50 hours, colloidal silica particles having a mean particle size of larger than 10 millimicrons could not be formed. This could be presumed because of the following reasons: In the step (e), a part of the active silicic acid in the feed solution as fed would not adhere to the surfaces of the colloidal silica particles but would form new nuclei particles in the solution. In particular, when the feeding speed of the feed solution is high, the proportion of the amount of the active silicic acid consumed to form such new nuclei to that which is to be consumed for growing the silica particles would increase. Therefore, colloidal silica particles having a mean particle size of 10 millimicrons or more could not be formed so efficiently in the case. Because of the said reasons, feeding of the feed solution at too high a speed is to be avoided. However, feeding of the feed solution of an amount of from 5 to 20 times of the heel solution in the course of a longer period of time of more than 200 hours is not efficient for the industrial scale production of silica sol. For the production of sols of a constant quality in an industrial scale plant, feeding of the feed solution is preferably effected continuously for a period of from 50 to 200 hours. In the step (e), if the liquid level in the inside of the container fluctuates along the wall of the container because of the feeding of the feed solution and the concentration of the liquid in the container which are carried out simultaneously, the gelled product of the silica sol would adhere to the wall of the container along which the liquid level fluctuated so that a favorable sol product could not be obtained. Accordingly, in the step (e), the feeding speed of the feed solution and the removing speed of the evaporated water are preferably so controlled that the liquid level in the container may be always constant. If the $SiO_2$ concentration of the silica sol as formed in the step (e) is concentrated up to more than 50% by weight or more, the viscosity of the resulting sol would increase to an undesired value. Therefore, it is desired not to form a sol having such a high concentration in the step (e).

Since the sol as formed in the step (e) contains the sodium content or potassium content as added in the previous step (d), the cations are removed from the sol by treatment of the sol with the cation-exchange resin and also small amount of anions in the sol is removed with the anion-exchange resin in the step (f). In particular, in order to further remove the alkali metal ions from the sol, the second-stage cation-exchange resin treatment is preferably effected. The cation-free sol as obtained in the step (f) does not show the instability like the active silicic acid-containing aqueous solution but it still does not have a sufficient stability. Therefore, it is recommended that the treatment of the sol with the ion-exchange resin is not effected at too high a temperature. The sol is stabilized in the next step (g) as soon as possible after the completion of the step (f), preferably immediately after the completion thereof. For the stabilization, ammonia is added to the sol whereby the resulting sol may have a pH value of from 8 to 10.5. Such ammonia may easily be available as an inexpensive aqueous ammonia of high purity. Additionally, the ammonia in the sol may easily be evaporated out from the silica sol after use. The silica sol prepared by the method of the present invention can be utilized favorably in various uses.

The following examples are intended to illustrate the present invention in more detail but not to limit it in any way.

EXAMPLE 1

Step (a)

A sodium water glass of JIS No. 3 was prepared as a water-soluble alkali metal silicate of a raw material. The essential components of the water glass except water were $SiO_2$ of 28.8% by weight, $Na_2O$ of 9.47% by weight, $Al_2O_3$ of 280 ppm, $Fe_2O_3$ of 45 ppm, CaO of 46 ppm and MgO of 25 ppm.

5.25 kg of the said water glass was dissolved in 36.75 kg of a pure water to prepare 42.0 kg of an aqueous sodium silicate solution having an $SiO_2$ concentration of 3.6% by weight.

Next, the thus prepared aqueous sodium silicate solution of 25° C. was passed through a column as filled with a hydrogen-type strong-acid cation-exchange resin Amberlite IR-120B, at a space velocity of 3 per hour, and 35.7 kg of the resulting active silicic acid-containing aqueous solution of 25° C., which had an $SiO_2$ concentration of 3.54% by weight, a pH value of 2.78 and an electroconductivity of 667.5 $\mu$S/cm, was recovered in a container.

Step (b)

Nitric acid of a commercial product of a special grade chemical (specific gravity: 1.38, $HNO_3$ content: 61.3 wt. %) was prepared as the acid to be employed in the step.

121.2 g of the nitric acid was added to 35.7 kg of the fresh active silicic acid-containing aqueous solution as obtained in the step (a) immediately after the formation of the solution, and the pH value of the resulting solution was made to be 1.54 and then allowed to stand as it was for 48 hours at 20° C. Accordingly, the step (b) was finished.

After completion of the step (b), the following steps (c) to (g) were carried out in order to prepare a stable aqueous silica sol of the present invention. As the hydrogen-type strong-acid cation-exchange resin was employed Amberlite IR-120B which had been treated with an aqueous sulfuric acid solution having a hydrogen ion content corresponding to three times of the cation-exchange capacity of the resin. As the hydroxyl-type strong-basic anion-exchange resin was employed Amberlite IRA-410 which had been treated with an aqueous sodium hydroxide solution having a hydroxyl content corresponding to three times of the anion-exchange capacity of the resin.

Step (c)

35.7 Kg of the fresh active silicic acid-containing aqueous solution as prepared in the above-mentioned step (b) was, immediately after formation thereof, passed through a column of about 25° C. as filled with the above-mentioned strong-acid Amberlite IR-120B at a space velocity of 5 per hour, and the whole amount of the resulting solution was then directly successively passed through a column of about 25° C. as filled with the above-mentioned strong-basic Amberlite IRA-410 at a space velocity of 3 per hour. Subsequently, the whole amount of the resulting solution was then passed through a column of about 25° C. as filled with a separately prepared above-mentioned strong-acid Amberlite IR-120B at a space velocity of 5 per hour, and 30.28 kg of the whole amount of the thus obtained solution was recovered in a container. The solution thus recovered in the container had an $SiO_2$ concentration of 3.52% by weight, a pH value of 4.38 and an electroconductivity of 7.20 $\mu$S/cm. It contained 0.25 ppm of $Al_2O_3$, 0.19 ppm of $Fe_2O_3$, 0.08 ppm of CaO and 0.02 ppm of MgO.

Step (d)

178 g of an aqueous 10 wt. % sodium hydroxide solution as obtained by dissolving sodium hydroxide of a commerial product of a special grade chemical (purity: 95%) in a pure water was added to 30.28 kg of the fresh active silicic acid-containing aqueous solution as obtained in the step (c), immediately after formation thereof, at about 25° C., to thereby obtain a stabilized active silicic acid-containing aqueous solution. The aqueous solution has an $SiO_2$ concentration of 3.5% by weight, a molar ratio of $SiO_2/Na_2O$ of 80, a pH value of 8.20 and an electroconductivity of 732 $\mu S/cm$.

Step (e)

A glass reaction container having an effective capacity of 5 liters was employed, which was equipped with a stirrer, a condenser, a pressure-reducing device, a liquid level sensor, an electromagnetic valve and a heating means.

2.67 kg of the fresh stabilized active silicic acid-containing solution as prepared in the step (d) was, immediately after formation thereof, put in the said reactor as a heel solution, and the temperature of the heel solution therein was adjusted to be 90° C. by heating. Next, 27.78 kg of the fresh stabilized active silicic acid-containing aqueous solution as prepared in the step (d) was, immediately after formation thereof, continuously fed into the said reactor as a feed solution over a period of 95 hours, whereupon the liquid temperature in the inside of the container was kept at 90° C. and the pressure therein was made reduced. During the procedure, the evaporated water was continuously removed from the reactor so that the amount of the liquid in the container was kept constant. The feeding speed of the feed solution was 292.4 g/hr. Accordingly, feeding of all the feed solution of 27.78 kg was finished in the said way. The silica sol as formed in the container was cooled to room temperature and the whole amount of 3.23 kg of the sol was taken out of the container.

The silica sol thus prepared had a specific gravity of 1.233, a pH value of 9.92, a viscosity at 20° C. of 26.0 cp, a mean particle size by BET method of 13.2 millimicrons and an electroconductivity of 3240 $\mu S/cm$. This was stable and no change in property was observed for one month or more at 60° C. This has an $SiO_2$ concentration of 33.0% by weight and a molar ratio of $SiO_2/Na_2O$ of 85.2 and contained 2.34 ppm of $Al_2O_3$ and 1.78 ppm of $Fe_2O_3$.

Step (f)

The silica sol prepared in the step (e) was passed through a column of about 25° C. as filled with a hydrogen-type strong acid cation-exchange resin Amberlite IR-120B, at a space velocity of 3 per hour, then the silica sol as resulted from the passing was passed through a column of about 25° C. as filled with a hydroxyl-type strong-basic anion-exchange resin Amberlite IRA-410 at a space velocity of 3 per hour, and last the silica sol as resulted from the passing was thereafter passed through a column of about 25° C. as filled with a hydrogen-type strong-basic anion-exchange resin Amberlite IR-120B at a space velocity of 3 per hour, to finally obtain 3.15 kg of an acidic aqueous silica sol.

The sol had a specific gravity of 1.205, a pH value of 4.72, a viscosity at 20° C. of 3.6 cp, an electroconductivity of 70 $\mu S/cm$, an $SiO_2$ concentration of 30.7% by weight, an $Na_2O$ content of 190 ppm and a molar ratio of $SiO_2/Na_2O$ of 1670.

Step (g)

15.0 g of an aqueous 28% ammonia of a commerical product of a special grade chemical was added to 2000 g of the fresh silica sol as obtained in the above-mentioned step (f) immediately after formation thereof, with stirring, to obtain 2015 g of a silica sol.

The thus obtained sol had a specific gravity of 1.205, a pH value of 9.20, a viscosity at 20° C. of 9.8 cp and an electroconductivity of 2820 $\mu S/cm$. This was stable and no change in property was observed for one month or more at 60° C. This had a $SiO_2$ concentration of 30.5% by weight and a molar ratio of $SiO_2/(NH_4)_2O$ of 83 and contained 2.16 ppm of $Al_2O_3$, 1.65 ppm of $Fe_2O_3$, 190 ppm of $Na_2$, 6.0 ppm of Cl and 8.2 ppm of $SO_4$. By electromicroscopic observation, the colloidal silica particles were found to have a broad particle size distribution of from the minimum particle size of about 4 millimicrons to the maximum particle size of about 20 millimicrons.

EXAMPLE 2

In Example 2, a silica sol was prepared by the process comprising the following steps (d) to (g), from the active silicic acid-containing aqueous solution as prepared in accordance with the step (c) of Example 1. The aqueous sodium hydroxide solution, aqueous ammonia, ion-exchange resins and reactors used were the same as those used in Example 1.

Step (d)

146 g of an aqueous 10 wt. % sodium hydroxide solution was added to 40.4 kg of the fresh active silicic acid-containing aqueous solution as obtained in the step (c), immediately after formation thereof, at 25° C., to obtain 40.55 kg of a stabilized active silicic acid-containing aqueous solution.

The aqueous solution has an $SiO_2$ concentration of 3.5% by weight, a pH value of 7.82, a molar ratio of $(SiO_2/Na_2O)$ of 130 and an electroconductivity of 612 $\mu S/cm$.

Step (e)

2.54 kg of the stabilized active silicic acid-containing aqueous solution as obtained in the step (d) was put in a reactor as a heel solution, and 38 kg of the stabilized active silicic acid-aqueous solution as obtained in the step (d) was continuously fed thereinto as a feed solution over a period of 180 hours whereupon the liquid temperature in the container was kept at the boiling point of 95° C. During the procedure, the inside of the container was kept to have a reduced pressure, and the amount of the liquid in the container was kept constant by continuously removing the evaporated water therefrom. The feeding speed of the feed solution was 211 g/hr. After completion of the reaction, the resulting silica sol was cooled and the whole amount of 3.33 kg of the sol was taken out of the container.

The thus obtained aqueous silica sol had a specific gravity of 1.320, a pH value of 9.76, a viscosity at 20° C. of 29.6 cp, an electroconductivity of 2020 $\mu S/cm$, and a mean particle size by BET method of 21.0 millimicrons. This was stable and no change in property was observed for one month or more at 60° C. This has an $SiO_2$ concentration of 42.6% by weight and a molar ratio of $SiO_2/Na_2O$ of 147 and contained 2:89 ppm of $Al_2O_3$ and 2.20 ppm of $Fe_23$.

Step (f)

The silica sol prepared in the step (e) was passed through a column of about 25° C. as filled with a cation-exchange resin at a space velocity of 3 per hour, then the silica sol as resulted from the passing was successively passed through a column of about 25° C. as filled with an anion-exchange resin at a space velocity of 3 per hour, and last the silica sol as resulted from the passing was thereafter passed through a column of about 25° C. as filled with a cation-exchange resin at a space velocity of 3 per hour, to finally obtain 3.1 kg of an acidic aqueous silica sol.

The sol thus obtained had a specific gravity of 1.293, a pH value of 4.70, a viscosity at 20° C. of 5.6 cp, an electroconductivity of 120 $\mu S/cm$, an $SiO_2$ concentration of 40.7% by weight, an $Na_2O$ content of 700 ppm and a molar ratio $SiO_2/Na_2O$ of 601.

Step (g)

19 g of an aqueous 28 wt. % ammonia and 9.6 g of an aqueous 10 wt. % nitric acid solution were added to 3000 g of the fresh aqueous silica sol as obtained in the step (f), immediately after formation thereof, at a liquid temperature of 25° C., to obtain 3030 g of a silica sol.

The sol had a specific gravity of 1.293, a pH value of 9.0, a viscosity at 20° C. of 22 cp and an electroconductivity of 3920 μS/cm. This was stable for one month or more at 60° C. This had an $SiO_2$ concentration of 40.3% by weight and a molar ratio of $SiO_2/(NH_4)_2O$ of 143 and contained 2.75 ppm of $Al_2O_3$, 2.09 ppm of $Fe_2O_3$, 693 ppm of $Na_2O$, 9.7 ppm of Cl, 14.5 ppm of $SO_4$ and 320 ppm of $NO_3$. By electromicroscopic observation, the colloidal silica particles were found to have a broad particle size distribution of from the minimum particle size of about 7 millimicrons to the maximum particle size of about 40 millimicrons, and they were found to have a non-spherical distorted shape.

COMPARATIVE EXAMPLE 1

In the comparative example, the feeding time for feeding the feed solution in the step (e) of Example 1 was varied to 32 hours, and the feed solution was fed at a higher feeding speed than that in the step (e) of Example 1. After the $SiO_2$ concentration in the liquid in the container reached about 25% by weight, the viscosity of the liquid in the container began to rise. In this stage, a small amount of the liquid was taken out from the container and the mean particle size of the colloidal silica therein was measured to be 6.8 millimicrons by BET method. After feeding of the feed solution was carried out further, the viscosity of the liquid was extremely high at the end point of the feeding, and formation of gels were observed.

The high-viscosity liquid could hardly be taken out from the container smoothly. After it was taken out from the container and was allowed to stand at room temperature for a while, it changed to a non-fluid.

As is obvious from the above-mentioned explanation, in accordance with the method of the present invention, a stable aqueous silica sol, which has an $SiO_2$ concentration of from 30 to 50% by weight and in which the colloidal silica particles have a mean particle size of from 10 to 30 millimicrons, may efficiently be prepared from a starting material of a water glass of an ordinary industrial product which contains polyvalent metals as impurities, and the aqueous silica sol thus to be prepared by the method of the present invention is a high-purity industrial product which has an alkali metal oxide content of 2000 ppm or less to silica and a polyvalent metal oxide content of 300 ppm or less to silica.

The aqueous silica sol to be prepared by the method of the present invention may therefore be utilized in various uses where conventional silica sols have heretofore been employed and, in particular, it is especially preferably utilized as an abrasive for polishing surfaces of semiconductors and a binder for catalysts and in other various fields which require a high-purity silica sol.

While the invention has been described in detail and with reference to the specific embodiment thereof, it will be apparent to one skilled in the art that various changes and modifications can be made therein without departing from the spirit and scope thereof.

What is claimed is:

1. A method of preparing a stable aqueous silica sol which has an $SiO_2$ concentration of from 30 to 50% by weight, which is substantially free from any other polyvalent metal oxides than silica and in which the colloidal silica particles have a mean particle size of from 10 to 30 millimicrons, the method being characterized by comprising the following steps (a), (b), (c), (d), (e), (f) and (g):

(a) a step where an aqueous solution of a water-soluble alkali metal silicate as dissolved therein in a concentration of from 2 to 6% by weight as the $SiO_2$ content to be derived from the silicate, the said silicate containing other polyvalent metal oxides than silica in a proportion to silica of from 500 to 10000 ppm, is passed through a column as filled with a hydrogen-type strong-acid cation-exchange resin in such an amount as being sufficient for ion-exchanging all the metal ions in the aqueous solution, at a temperature of from 0° to 60° C. as the liquid temperature in the inside of the column and at a space velocity of from 1 to 10 per hour, and the aqueous solution of the active silicic acid which resulted from the passing and which has an $SiO_2$ concentration of from 2 to 6% by weight and a pH value of from 2 to 4 is recovered;

(b) a step where a strong acid is added to the aqueous solution of the active silicic acid as recovered in the step (a) so that the said aqueous solution is adjusted to have a pH value of from 0 to 2.0 and then the resulting aqueous solution is kept at a temperature between 0° C. and 100° C. for a period of from 0.5 to 120 hours;

(c) a step where the aqueous solution as obtained in the step (b) is passed through a column as filled with a hydrogen-type strong-acid cation-exchange resin in such an amount as being sufficient for ion-exchanging all the metal ions in the aqueous solution, at a temperature of from 0° to 60° C. as the liquid temperature in the inside of the column and at a space velocity of from 2 to 20 per hour, the aqueous solution which resulted from the passing is then passed through a column as filled with a hydroxyl-type strong-basic anion-exchange resin in such an amount as being sufficient for ion-exchanging all the anions in the solution, at a temperature of from 0° to 60° C. as the liquid temperature in the inside of the column at a space velocity of from 1 to 10 per hour, and thereafter the aqueous solution of the active silicic acid which resulted from the passing and which is substantially free from any other soluble substances than the active silicic acid and has an $SiO_2$ concentration of from 2 to 6% by weight and a pH value of from 2 to 5 is recovered;

(d) a step where an aqueous solution of sodium or potassium hydroxide is added to the aqueous solution of the active silicic acid as recovered in the step (c), in a molar ratio of $SiO_2/M_2O$ of being from 60 to 200, $M_2O$ (where M means sodium atom or potassium atom) being one as derived from the hydroxide and $SiO_2$ being one as contained in the said aqueous solution of the active silicic acid, with keeping the liquid temperature at 0° to 60° C., thereby to form a stabilized active silicic acid-containing aqueous solution having an $SiO_2$ concentration of from 2 to 6% by weight and a pH value of from 7 to 9;

(e) a step where the stabilized active silicic acid-containing aqueous solution as obtained in the step (d)

is put in a container in an amount of 1 part by weight as a heel solution whereupon the liquid temperature in the inside of the container is kept at 70° C. to 100° C., and from 5 to 20 parts by weight of the stabilized active silicic acid-containing aqueous solution as obtained in the step (d) is continuously fed into the said container as a feed solution for a period of from 50 to 200 hours while the said container is maintained to have a normal pressure or a reduced pressure and to evaporate water in the liquid and the evaporated water is removed from the said container so that the content of the liquid in the inside of the container may be kept constant during the procedure, thereby to form a stable aqueous silica sol which has an $SiO_2$ concentration of from 30 to 50% by weight and in which the colloidal silica has a mean particle size of from 10 to 30 millimicrons;

(f) a step where the stable aqueous silica sol as obtained in the step (e) is passed through a column as filled with a hydrogen-type strong-acid cation-exchange resin in such an amount as being sufficient for ion-exchanging all the metal ions as contained in the sol, at a temperature of from 0° to 60° C. and at a space velocity of from 2 to 20 per hour, then the solution which resulted from the passing is passed through a column as filled with a hydroxyl-type strong-basic anion-ion-exchange resin in such an amount as being sufficient for ion-exchanging all the anions in the solution, at a temperature of from 0° to 60° C. and at a space velocity of from 1 to 10 per hour, and then the acidic aqueous silica sol which resulted from the passing and which is substantially free from any other polyvalent metal oxides than silica is recovered; and (g) a step where ammonia is added to the acidic aqueous sol as recovered in the step (f), with keeping the temperature of the sol at 0° to 100° C. to make the pH value of the sol to be from 8 to 10.5, thereby to form a stable aqueous silica sol which has an $SiO_2$ concentration of from 30 to 50% by weight, which is substantially free from any other polyvalent metal oxides than silica and in which the colloidal silica has a mean particle size of from 10 to 30 millimicrons.

2. The method of preparing an aqueous silica sol as claimed in claim 1, in which the water-soluble alkali metal silicate in the step (a) is a sodium water glass having a molar ratio of $SiO_2/Na_2O$ of from 2 to 4.

3. The method of preparing an aqueous silica sol as claimed in claim 1, in which the strong acid in the step (b) is nitric acid.

4. The method of preparing an aqueous silica sol as claimed in claim 1, in which the aqueous sodium or potassium hydroxide solution in the step (d) is one having a concentration of the hydroxide of from 2 to 20% by weight.

5. The method of preparing an aqueous silica sol as claimed in claim 1, in which the ammonia in the step (g) is an aqueous ammonia having an ammonia concentration of from 5 to 30% by weight.

6. A method of preparing a stable aqueous silica sol which has an $SiO_2$ concentration of from 30 to 50% by weight, which is substantially free from any other polyvalent metal oxides than silica and in which the colloidal silica particles have a mean particle size of from 10 to 30 millimicrons, the method being characterized by comprising the following steps (a), (b), (c), (d), (e), (f) and (g):

(a) a step where an aqueous solution of a water-soluble alkali metal silicate as dissolved therein in a concentration of from 2 to 6% by weight as the $SiO_2$ content to be derived from the silicate, the said silicate containing other polyvalent metal oxides than silica in a proportion to silica of from 500 to 10000 ppm, is passed through a column as filled with a hydrogen-type strong-acid cation-exchange resin in such an amount as being sufficient for ion-exchanging all the metal ions in the aqueous solution, at a temperature of from 5° to 50° C. as the liquid temperature in the inside of the column and at a space velocity of from 1 to 10 per hour, and the aqueous solution of the active silicic acid which resulted from the passing and which has an $SiO_2$ concentration of from 2 to 6% by weight and a pH value of from 2 to 4 is recovered;

(b) a step where a strong acid is added to the aqueous solution of the active silicic acid as recovered in the step (a), immediately after recovery thereof, so that the said aqueous solution is adjusted to have a pH value of from 0 to 2.0 and then the resulting aqueous solution is kept at a temperature between 0° C. and 40° C. for a period of from 10 to 120 hours or at a temperature between 40° C. and 60° C. for a period of from 2 to 10 hours;

(c) a step where the aqueous solution as obtained in the step (b) is passed through a column as filled with a hydrogen-type strong-acid cation-exchange resin in such an amount as being sufficient for ion-exchanging all the metal ions in the aqueous solution, at a temperature of from 5° to 50° C. as the liquid temperature in the inside of the column and at a space velocity of from 2 to 20 per hour, then the aqueous solution which resulted from the passing is then passed through a column as filled with a hydroxyl-type strong-basic anion-exchange resin in such an amount as being sufficient for ion-exchanging all the anions in the solution, at a temperature of from 5° to 50° C. as the liquid temperature in the inside of the column at a space velocity of from 1 to 10 per hour, then the aqueous solution which resulted from the passing is passed through a column as filled with a hydrogen-type strong-acid cation-exchange resin in such an amount as being sufficient for ion-exchanging all the metal ions in the solution, at a temperature of from 5° to 50° C. as the liquid temperature in the inside of the column and at a space velocity of from 2 to 20 per hour, and thereafter the aqueous solution of the active silicic acid which resulted from he passing and which has an $SiO_2$ concentration of from 2 to 6% by weight and a pH value of from 2 to 5 is recovered;

(d) a step where an aqueous solution of sodium or potassium hydroxide is added to the aqueous solution of the active silicic acid as recovered in the step (c), immediately after recovery thereof, in a molar ratio of $SiO_2/M_2O$ of being from 60 to 200, $M_2O$ (where M means sodium atom or potassium atom) being one as derived from the hydroxide and $SiO_2$ being one as contained in the said aqueous solution of the active silicic acid, with keeping the liquid temperature at 5° to 60° C., thereby to form a stabilized active silicic acid-containing aqueous solution having an $SiO_2$ concentration of from 2 to 6% by weight and a pH value of from 7 to 9;

(e) a step where the stabilized active silicic acid-containing aqueous solution as obtained in the step (d) is put in a container in an amount of 1 part by weight as a heel solution whereupon the liquid temperature in the inside of the container is kept at 80° C. to 100° C., and from 5 to 20 parts by weight of the stabilized active silicic acid-containing aqueous solution as obtained in the step (d) is continuously fed into the said container as a feed solution for a period of from 50 to 200 hours while the said container is maintained to have a normal pressure or a reduced pressure and to evaporate water in the liquid and the evaporated water is removed from the said container so that the content of the liquid in the inside of the container may be kept constant during the procedure, thereby to form a stable aqueous silica sol which has an $SiO_2$ concentration of from 30 to 50% by weight and in which the colloidal silica has a mean particle size of from 10 to 30 millimicrons;

(f) a step where the stable aqueous silica sol as obtained in the step (e) is passed through a column as filled with a hydrogen-type strong-acid cation-exchange resin in such an amount as being sufficient for ion-exchanging all the metal ions as contained in the sol, at a temperature of from 5° to 50° C. and at a space velocity of from 2 to 20 per hour, then the solution which resulted from the passing is passed through a column as filled with a hydroxyl-type anion-exchange resin in such an amount as being sufficient for ion-exchanging all the anions in the solution, at a temperature of from 5° to 50° C. and at a space velocity of from 1 to 10 per hour, then the aqueous solution which resulted from the passing is passed through a column as filled with a hydrogen-type strong-acid cation-exchange resin in such an amount as being sufficient for ion-exchanging all the metal ions in the solution, at a temperature of from 5° to 50° C. as the liquid temperature in the inside of the column and at a space velocity of from 2 to 20 per hour, then the acidic aqueous silica sol which resulted from the passing and which is substantially free from any other polyvalent metal oxides than silica is recovered; and (g) a step where ammonia is added to the acidic aqueous sol as recovered in the step (f), immediately after recovery thereof, with keeping the temperature of the sol at 5° to 100° C. to make the pH value of the sol to be from 8 to 10.5, thereby to form a stable aqueous silica sol which has an $SiO_2$ concentration of from 30 to 50% by weight, which is substantially free from any other polyvalent metal oxides than silica and in which the colloidal silica particles have a mean particle size of from 10 to 30 millimicrons.

7. The method of preparing an aqueous silica sol as claimed in claim 6, in which the water-soluble alkali metal silicate in the step (a) is a sodium water glass having a molar ratio of $SiO_2/Na_2O$ of from 2 to 4.

8. The method of preparing an aqueous silica sol as claimed in claim 6, in which the solution to which the nitric acid has been added in the step (b) is allowed to stand at a temperature between 0° C. and 60° C. for a period of from 2 to 120 hours.

9. The method of preparing an aqueous silica sol as claimed in claim 6, in which the aqueous sodium or potassium hydroxide solution in the step (d) is one having a concentration of the hydroxide of from 2 to 20% by weight.

10. The method of preparing an aqueous silica sol as claimed in claim 6, in which the solution to be formed in the step (d) as the feed solution for the step (e) is prepared continuously and separately from the solution to be formed in the step (d) as the heel solution for the step (e), and the fresh solution thus separately prepared in the step (d) is, immediately after preparation thereof, used as the feed solution in the step (e).

11. The method of preparing an aqueous silica sol as claimed in claim 6, in which the ammonia in the step (g) is an aqueous ammonia having an ammonia concentration of from 5 to 30% by weight.

* * * * *